United States Patent
Kennedy

(10) Patent No.: US 7,946,429 B2
(45) Date of Patent: May 24, 2011

(54) SORTING APPARATUS AND METHOD

(75) Inventor: Hamish Alexander Nigel Kennedy, Auckland (NZ)

(73) Assignee: Anzpac Systems Limited, Auckland (NZ)

( * ) Notice: Subject to any disclaimer, the term of this patent is extended or adjusted under 35 U.S.C. 154(b) by 1146 days.

(21) Appl. No.: 10/513,728

(22) PCT Filed: May 7, 2003

(86) PCT No.: PCT/NZ03/00084
§ 371 (c)(1), (2), (4) Date: Jun. 20, 2006

(87) PCT Pub. No.: WO03/095343
PCT Pub. Date: Nov. 20, 2003

(65) Prior Publication Data
US 2006/0237350 A1    Oct. 26, 2006

(30) Foreign Application Priority Data
May 8, 2002  (NZ) ....................... 518851

(51) Int. Cl.
B07C 1/00 (2006.01)
(52) U.S. Cl. ...... 209/655; 209/651; 198/456; 198/460.1
(58) Field of Classification Search .................. 209/592, 209/596, 651, 655, 912; 198/370.01, 370.04, 198/370.05, 597
See application file for complete search history.

(56) References Cited

U.S. PATENT DOCUMENTS

| | | | |
|---|---|---|---|
| 3,225,891 A | 12/1965 | Hickin et al. | |
| 3,905,469 A * | 9/1975 | Harrison | 198/355 |
| 4,428,179 A | 1/1984 | Jordan et al. | |
| 5,022,532 A | 6/1991 | D'Urso | |
| 5,024,047 A | 6/1991 | Leverett | |
| 5,305,892 A * | 4/1994 | Kronseder | 209/523 |
| 5,626,238 A | 5/1997 | Blanc | |
| 5,813,195 A | 9/1998 | Nielsen et al. | |

(Continued)

FOREIGN PATENT DOCUMENTS
EP    0 989 080    3/2000
(Continued)

OTHER PUBLICATIONS

Supplementary European Search Report EP 03 72 8176 completed Sep. 11, 2008.

*Primary Examiner* — Terrell H Matthews
(74) *Attorney, Agent, or Firm* — Nixon Peabody LLP; Jeffrey L. Costellia

(57) ABSTRACT

A sorting apparatus (1) has a first conveyor (2) with a plurality of cups (4) to receive products such as fruit (3). Moving substantially parallel with the first conveyor (2) is at least a second conveyor (5) having a plurality of discrete product holding compartments or pockets (6). The second conveyor (5) can move in the same or opposite direction to that of the first conveyor (2). The first conveyor (2) is operated so that products (3) are selectively discharged from the first conveyor (2) into respective compartments (6) until a required number of the products having a prescribed characteristic have been received and that pocket (6) can then be moved to the product transfer or emptying point. The characteristic of the product (3) can be for example type, weight, quantity, colour, shape, surface quality and/or density.

27 Claims, 3 Drawing Sheets

U.S. PATENT DOCUMENTS

| | | | |
|---|---|---|---|
| 5,881,889 A * | 3/1999 | Poulsen | 209/657 |
| 5,988,356 A * | 11/1999 | Bonnet | 198/598 |
| 6,122,895 A | 9/2000 | Schubert | |
| 6,151,866 A * | 11/2000 | Connell | 53/443 |
| 6,206,170 B1 * | 3/2001 | Kissel et al. | 198/370.04 |
| 6,262,377 B1 * | 7/2001 | Nielsen et al. | 177/1 |
| 6,437,256 B1 * | 8/2002 | Miyamoto | 177/25.18 |
| 6,446,788 B1 * | 9/2002 | Leidy et al. | 198/502.4 |
| 6,683,261 B2 * | 1/2004 | Murata et al. | 177/25.18 |
| 6,758,327 B1 * | 7/2004 | Stebnicki et al. | 198/832 |
| 6,787,712 B2 * | 9/2004 | Asai et al. | 177/25.18 |
| 6,881,907 B2 * | 4/2005 | Winkelmolen | 177/145 |
| 7,134,258 B2 * | 11/2006 | Kalany et al. | 53/473 |
| 2001/0049923 A1 | 12/2001 | Huppi et al. | |
| 2003/0182898 A1 | 10/2003 | Huppi et al. | |
| 2004/0159526 A1 * | 8/2004 | Veit et al. | 198/370.02 |
| 2004/0173387 A1 * | 9/2004 | Criscione et al. | 177/145 |

FOREIGN PATENT DOCUMENTS

| | | |
|---|---|---|
| EP | 1 074 822 | 2/2001 |
| EP | 1 352 831 | 10/2003 |
| JP | 09-057217 A | 3/1997 |
| JP | 11-090350 | 4/1999 |
| JP | 2002-143779 A | 5/2002 |
| WO | WO 00/23771 A | 4/2000 |

* cited by examiner

SORTING APPARATUS AND METHOD

BACKGROUND TO INVENTION

The present invention relates to improvements in and relating to sorting apparatus and methods for use in sorting. The present invention relates to the sorting of any type of product but for simplicity will be described particularly in respect of the sorting of fruit or other food product.

The term "sorting" is used throughout this specification to include any identification process including merely counting.

In the sorting of fruit a large number of randomly sized fruit of a particular type typically need to be sorted and this sorting can be for a variety of purposes including to sort the fruit into groups having similar properties and/or the required combined weight.

To the present time the applicant is aware of two basic types of sorting equipment.

The first type relies on a conveyor to deliver fruit or other products to a number of fixed delivery points along the length of the machine with each delivery point accepting fruit having certain characteristics such as weight or size. With this type of machine the number and location of each delivery point or "drop" is fixed by the physical design of the equipment. For example a fruit grading machine may have 10 outlets along its length into which it can deliver fruit. Therefore this machine could only grade fruit into 10 different categories at any one point in time although categories may be mixed at the respective outlets.

The second type of sorting machine provides for the random delivery of products to a number of outlets. The weight of the products at the respective outlets will then be weighed and from the measurements taken, the best combination of individual outlets are chosen to give the required weight. For example the sorting machine may have 12 collection outlets each of which may be filled with fruit and individually weighed. If then the fruit in each outlet weighed about 100 grams and a bag was required to be filled with one kilogram of fruit, then the 10 outlets which most closely added to this target weight would be selected and emptied into a common chute to fill the bag. Although this method can be used to deliver a constantly variable output i.e. the output weight of every cycle can be different, it is limited by the fact that the fruit is randomly allocated to the outlets. This random allocation means that the consistency in size or colour of the fruit being delivered by the grader would only be as consistent as the fruit being fed into it. These machines therefore often require a pre-grader.

It will be seen therefore that existing grading systems are either limited in their number of outlets (and hence variety of grades of product) or require the use of a pre-grader of some form.

The reference to the above existing systems does not indicate that they form part of common general knowledge in any specific country or region in the world.

OBJECTS OF THE INVENTION

It is an object of at least one embodiment of the invention to provide a sorting apparatus and/or method for sorting which may be more flexible and may be simpler and cheaper or will at least ameliorate the problems with such apparatus and/or methods to the present time or at least will provide the public with a useful choice.

The above objects are to be read disjunctively and further objects of this invention may become apparent from the following description.

SUMMARY OF THE INVENTION

According to one aspect of the present invention there is provided a sorting apparatus including a first conveyor which in use will convey a plurality of products to be sorted and a second conveyor adapted to move relative to said first conveyor to selectively receive products from said first conveyor, said second conveyor having a plurality of discrete product receiving means which are able to receive a plurality of products having a prescribed characteristic.

According to a second aspect of the present invention a method of sorting a plurality of products includes providing a first conveyor, transporting a plurality of products to be sorted on said first conveyor and said method further including providing a second conveyor and operating said second conveyor so that it moves relative to said first conveyor, said second conveyor being provided with a plurality of discrete product receiving means, said method further including operating said first conveyor so that products are selectively discharged from said first conveyor into respective said product receiving means so that said product receiving means are able to receive a plurality of said products having a prescribed characteristic.

In one embodiment the second conveyor is positioned adjacent a first side of the first conveyor and a third conveyor also adapted to move relative to the first conveyor is positioned adjacent an opposite side of the first conveyor and has discrete product receiving means to receive from the first conveyor products having a prescribed characteristic.

In one embodiment the prescribed characteristic of the three immediately above paragraphs may be a prescribed type, weight, quantity, colour, shape, surface quality and/or density.

In one embodiment the first and/or second and/or third conveyor may be controllable so that its speed of travel is constant, indexed or variable.

In one embodiment the second and/or third conveyor is/are provided as a plurality of conveyors adapted to selectively convey the products in the same and/or opposite direction of travel as the first conveyor.

In one embodiment an intermediate product collection means may be provided between the first and second and/or third conveyors.

In one embodiment the intermediate collection means may be in the form of a plurality of chutes which are able to store the products until an appropriate product receiving means is available on said second and/or third conveyor.

In one embodiment means are provided to detect at least one said prescribed characteristic.

According to a still further aspect of the present invention a method of sorting a plurality of products includes providing a first conveyor, transporting a plurality of products to be sorted on said first conveyor and said method further including providing a second conveyor and operating said second conveyor so that it moves relative to said first conveyor, said second conveyor being provided with a plurality of discrete product receiving means, said method further including operating said first conveyor so that products are selectively discharged from said first conveyor into respective said product receiving means so that said product receiving means are able to receive a plurality of said products having a prescribed characteristic.

According to a still further aspect of the present invention there is provided a sorting apparatus and/or a method of sorting substantially as herein described with reference to any one of FIG. 1, 2 or 3 of the accompanying drawings.

BRIEF DESCRIPTION OF PREFERRED EMBODIMENTS

As mentioned previously, the present invention seeks to avoid the limitations of existing sorting machines and sorting methods particularly in respect of the number of outlets which can be provided and to avoid a requirement to use a pre-grader as part of the sorting operation.

Figure 1:
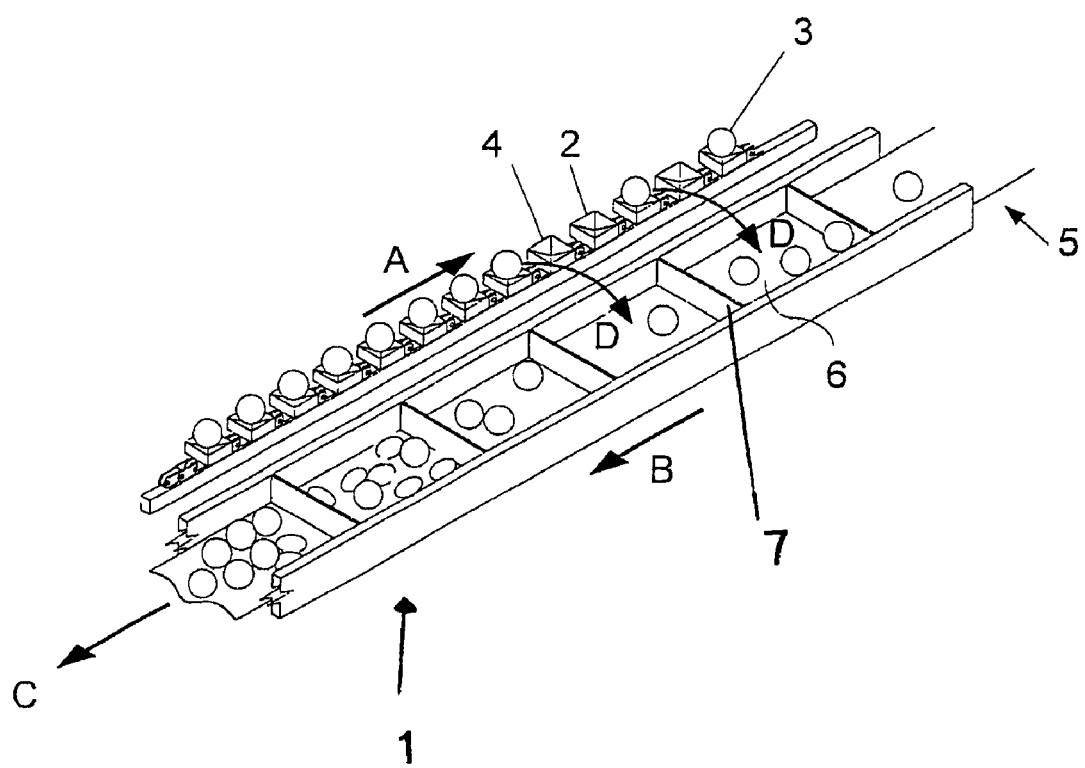
FIG. 1: Shows very diagrammatically a sorting apparatus according to one possible embodiment of the invention.

Referring therefore to FIG. 1, in one embodiment the sorting apparatus 1 of the present invention is shown to include a first conveyor 2 which may be of the type having a plurality of individual cups 4 each of which may carry an individual product 3 as the conveyor 2 travels in a direction of arrow A. However multiple products 3 may be carried in each cup 4 particularly if weight targeting was the only requirement. The cups are controllable by any suitable means to enable the discharge of the products 3 as required as indicated by the arrows D. Suitably the cups 4 can pivot sideways and a tipping mechanism controlled by a suitable control means can cause the pivoting as required. A detecting or sensing means will be provided (not shown) at a suitable point or points along the path of the conveyor 2 to detect one or more characteristics of the products 3. Shown in this embodiment moving substantially parallel with conveyor 2 is a second collection conveyor 5 having a plurality of discrete product holding compartments or pockets 6. The pockets 6 may be provided for the conveyor 5 in any suitable manner such as by using a cleated endless belt conveyor or by any other suitable means. As illustrated however; at least during the time when the conveyor 5 is intended to receive products from the conveyor 2, there will be a partition or wall or the like 7 separating the individual pockets 6 so as to avoid transfer of products between adjacent pockets.

In the example shown in FIG. 1 the second conveyor 5 is moving in an opposite direction B to that of conveyor 1 and towards the relevant processing equipment via a suitable transfer point in the direction of arrow C. At the transfer point the products would be emptied from the pockets 6.

It will be appreciated that existing technology of any suitable type could be used to grade the products 3 according to particular characteristics such as weight so that instead of the graded products being assigned to a fixed drop location as in previous systems they are able to be delivered to a predetermined pocket 6 of the conveyor 5.

It is envisaged that computer software would keep track of not only which grade of product was being assigned to each pocket 6 but also, as the conveyor 5 is moveable, the location of each pocket 6 along the machine 1. The intention would be to first fill the pocket 6 closest to the pocket transfer (emptying) point with the correct type, quantity and/or weight of product. However if the ideal product was initially unavailable to complete the requirements for a particular pocket 6 then additional pockets could be assigned to collect this grade product while waiting. Once the correct quantity of product was delivered into a pocket 6 then the conveyor 5 would index or move the products to a transfer point where the pocket 6 would be emptied from the appropriate pocket and delivered to downstream equipment.

It will be seen that substantial benefits of the present invention exist particularly in respect of its flexibility. Not only may each and every pocket 6 be assigned products of different characteristics or parameters but also any empty pocket 6 may be automatically reassigned to compensate for variations in the size, type or quality of product being fed into the machine 1.

Other benefits will be:

Reduced or no need to presort products, as the system can sort mixed product sizes into discrete groupings;

If the target weight of a required grouping of products is larger than that which can be held by a single pocket 6 then two or more pockets 6 can be grouped together;

The number of product "drops" of the machine 1 is not fixed;

The capacity of the machine 1 can be increased by increasing the length of machine 1;

The present invention could be incorporated into the design of existing product grading equipment to allow the option of having both moving and fixed drop locations on any one machine;

The collection conveyor 5 could transfer and deliver product to ancillary processing equipment which may reduce the number of additional conveyors required. This may also allow any such processing equipment to be grouped together rather than being spread out along the sorting machine.

The accuracy of the machine 1 could be increased by increasing the length of the machine (the more options the greater the accuracy particularly in weight filling).

In the application of the present invention a typical use may be the sorting of fruit into groups in which all the items of fruit must be within a particular weight range and have a prescribed combined weight. This would apply where for example fruit was required to be pre-packed in bags by the packing house for sale in shops and supermarkets with each bag required to have a set weight of fruit and with each fruit having similar characteristics.

It will be appreciated that apart from sorting by weight the present invention could readily be used to grade and sort by colour, shape, surface quality, density etc. Additionally it is envisaged that a collection conveyor 5 may be provided on both sides of the primary conveyor 2 in order to increase capacity.

It is also envisaged that the primary conveyor 2 and/or the collection conveyor(s) 5 could be operated to run continuously in either direction, indexed in either direction, run in a start/stop mode or in any combination of the above.

Figure 2:
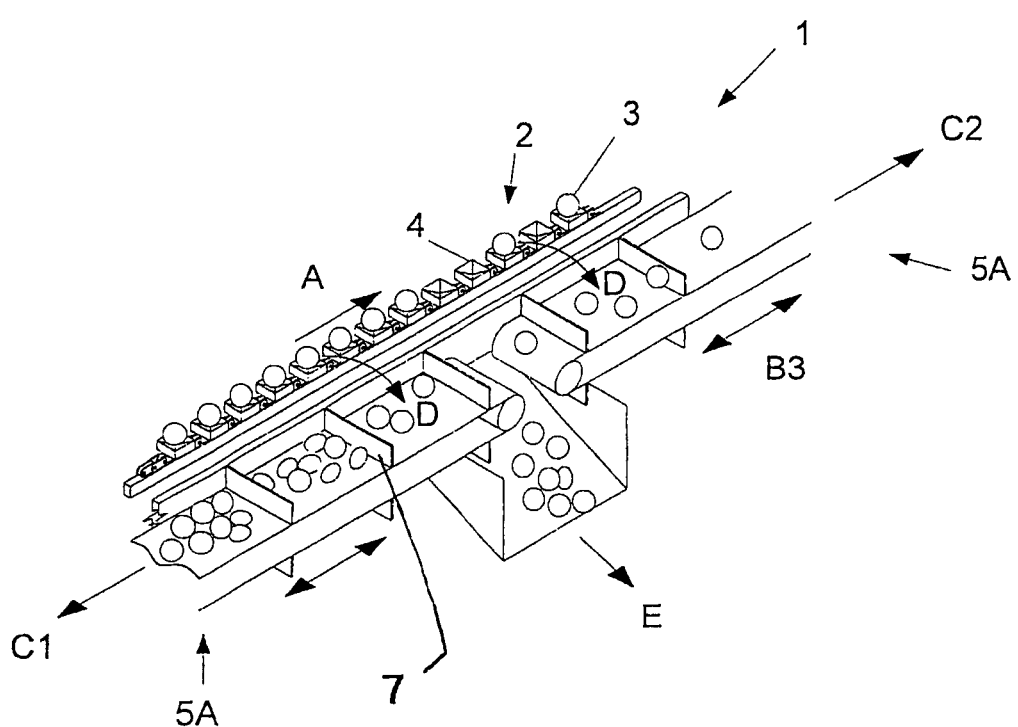
FIG. 2: Shows very diagrammatically a sorting apparatus according to a further embodiment of the invention.

In a further embodiment of the present invention shown in FIG. 2, the equivalent reference numerals have been used where appropriate.

The collection conveyor is seen in this embodiment to include a plurality, two being shown, of shorter collection conveyors 5A. The particular benefit of this embodiment would be to enable more transfer (emptying) points along the length of the machine 1. Products in this example are being shown being discharged in the direction of arrow E.

The control of the direction and speed of travel of the conveyors 5A as indicated by arrows B3 can be adapted to suit the required transfer and processing requirements.

Figure 3:
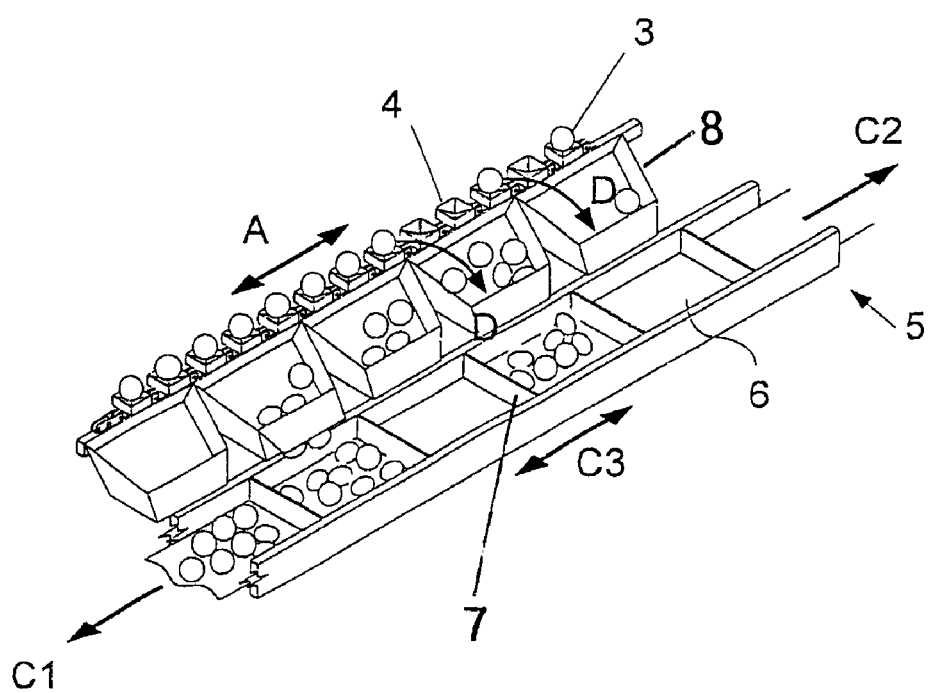
FIG. 3: Shows very diagrammatically a sorting apparatus according to a still further embodiment of the invention.

It is also envisaged that between the primary conveyor 2 and the one or more collection conveyors 5, collection chutes or guides may be provided so as to guide the products and if appropriate cushion their travel between the conveyors. Additionally, as shown in further embodiments of FIG. 3, the chutes 8, mentioned above, may also act as temporary holding devices for the products. This may be useful where the chutes 8 are able to store products until an appropriate pocket 6 on the collection conveyor 5 was available. Control means may be provided so that part or all of the contents of any one or more of the chutes 8 may be emptied into one or more of the pockets 6 at the appropriate time.

Where in the foregoing description, reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope or spirit of the invention as defined in the appended claims.

The invention claimed is:

1. A sorting apparatus including:
 a first conveyor which in use will convey a plurality of products to be sorted; and
 a second conveyor adapted to move relative to said first conveyor to selectively receive products from said first conveyor, said second conveyor having a plurality of discrete product receivers which are able to receive a plurality of products having a prescribed characteristic,
 wherein the sorting apparatus is controllably operable to discharge product from the first conveyor to the second conveyor and wherein the location of discharge is not fixed, and wherein the sorting apparatus is controllably operable to discharge product from the first conveyor to said discrete product receivers simultaneously at a plurality of locations.

2. The sorting apparatus of claim 1 wherein said second conveyor is positioned adjacent a first side of said first conveyor and a third conveyor also adapted to move relative to said first conveyor to selectively receive products from said first conveyor is positioned adjacent an opposite side of said first conveyor and has discrete product receivers to receive from the first conveyor, products having a prescribed characteristic.

3. The sorting apparatus of claim 1 wherein an intermediate collector is provided between the first and second conveyors.

4. The sorting apparatus of claim 3 in which said intermediate collector includes a plurality of chutes which are able to store the products until an appropriate product receiver is available on said second conveyor.

5. The sorting apparatus of claim 4 in which control means are provided so, that part or all of the contents of any one or more of the said chutes may be emptied into one or more of the said product receivers at an appropriate time.

6. The sorting apparatus of claim 1 wherein said second conveyors is adapted to travel in the same and/or opposite directions as said first conveyor.

7. The sorting apparatus of claim 1 wherein said proscribed characteristic is from a group consisting of type, weight, quantity, colour, shape, surface quality and/or density.

8. The sorting apparatus of claim 1 wherein said second conveyor is provided as a plurality of discrete collection conveyors adapted to selectively convey the products in the same and/or the opposite direction of travel as the first conveyor.

9. The sorting apparatus of claim 1 wherein at least one of the first and second conveyors are controllable so that its speed of travel is constant, indexed or variable.

10. A method of sorting a plurality of products including:
 providing a first conveyor;
 transporting a plurality of products to be sorted on said first conveyor;
 providing a second conveyor and operating said second conveyor so that it moves relative to said first conveyor, said second conveyor being provided with a plurality of discrete product receiving means; and
 operating said first conveyor so that products are selectively discharged from said first conveyor into respective said product receiving means, the location of discharge being variable dependent on the location of the product receiving means into Which the products are required to be discharged for sorting purposes, so that said product receiving means are able to receive a plurality of said products having a prescribed characteristic, wherein products are discharged from the first conveyor to said discrete product receiving means simultaneously at a plurality of locations.

11. The sorting apparatus of claim 2, wherein an intermediate collector comprising a plurality of chutes for temporarily receiving said products prior to transfer to the second conveyor is provided between the first and second conveyors.

12. The sorting apparatus of claim 1, wherein the second conveyor is an endless conveyor and the discrete product receivers are formed by spaced apart partitions or walls.

13. The sorting apparatus of claim 12 operable to transfer product received by the second conveyor from the first conveyor out of the discrete product receivers at one or more transfer points.

14. The sorting apparatus of claim 2, wherein the second conveyor is an endless conveyor and the discrete product receivers of the second conveyor am formed by spaced apart partitions or walls and wherein at least one transfer point is provided at which product is ejected from the second conveyor due to movement of the conveyor.

15. The sorting apparatus of claim 1 wherein the first conveyor has a plurality of discrete product holders for holding said products in units to be sorted, each discrete product holder operable to discharge product independently of other product holders.

16. The sorting apparatus of claim 1 controllably operable to discharge product from the first conveyor to said discrete product receivers simultaneously at more than two locations.

17. The sorting apparatus of claim 1 including a controller operable to:
 a) receive data indicative of how product carried by the first conveyor should be sorted;
 b) assign each discrete product receiving means a class of product;
 c) control the discharge of product from the first-conveyor to individual said product receiving means dependent on the data received in step a) and the assignment made in step b).

18. The sorting apparatus of claim 17 wherein the controller is operable to discharge product to a discrete product receiving means until at least one of:
 a) the number of items of product reaches a predetermined amount; and
 b) the weight of items of product reaches a predetermined amount.

19. The sorting apparatus of claim 18, wherein the controller is operable to control movement of the product receiving means relative to the first conveyor and control discharge of product into the product receiving means to obtain an optimal allocation of product to each product receiving means having regard to the predetermined amount and/or predetermined weight.

20. The sorting apparatus of claim 17, wherein the controller is operable to assign a plurality of the discrete product receiving means the same class of product as required to allow at least one of:
   a) a group of product to be formed across two or more discrete product receiving means:
   b) a first of said plurality of the discrete product receiving means to remain temporarily unused while product in said class of product is discharged to a second of said plurality of the discrete product receiving means until product in one of the discrete product holding means has appropriate characteristics to complete a predefined group of product in the first of said plurality of the discrete product receiving means.

21. A method of sorting a plurality of products including:
   providing a first conveyor having a plurality of discrete product holders;
   transporting a plurality of products to be sorted on said first conveyor;
   providing a second conveyor next to the first conveyor and operating said second conveyor so that it moves relative to said first conveyor, said second conveyor being provided with a plurality of discrete product receiving means; and
   operating said first conveyor so that products are selectively discharged from said first conveyor into respective said product receiving means wherein product is discharged from each product holder independently of other product holders and the location of discharge is variable dependent on the location of the product receiving means into which the products are required to be discharged for sorting purposes, so that said product receiving means are able to receive a plurality of said products sorted into a group, and further so that products are discharged from the first conveyor to said discrete product receiving means simultaneously at a plurality of locations.

22. An automated sorting apparatus comprising;
   a first conveyor having a plurality of product holders to hold and convey product to be sorted;
   a second conveyor having a plurality of discrete product receivers each capable of receiving a plurality items of said product, the first and second conveyors being movable relative to each other; and
   a controller to identify in which of the product receivers product in each of the product holders is to be located, determine a location when each of the product holders is to eject product so that it can be received by a required one of the product receivers and cause each product holder to discharge product that it is holding at the determined non-fixed location, and wherein the sorting apparatus is controllably operable to discharge product from the first conveyor to said discrete product receivers simultaneously at a plurality of locations.

23. The automated sorting apparatus of claim 22, wherein the product holders hold individual items of product.

24. The automated sorting apparatus of claim 23, wherein the second conveyor is an endless conveyor including at least one transfer point where product is discharged from the second conveyor.

25. The automated sorting apparatus of claim 22, including a plurality of product collectors for receiving product discharged from said first conveyor temporarily before ejecting product to the said second conveyor and relative to which the first and second conveyors are movable, the product collectors being controllable to eject product to the second conveyor when the product will be received by a required product receiver.

26. The automated sorting apparatus of claim 22, wherein the first conveyor discharges product directly to the second conveyor.

27. A sorting apparatus including:
   a first conveyor which in use will convey a plurality of products to be sorted; and
   a second conveyor adapted to move relative to said first conveyor to selectively receive products from said first conveyor, said second conveyor having a plurality of discrete product receivers which are able to receive a plurality of products having a prescribed characteristic,
   wherein the sorting apparatus is controllably operable to discharge product from the first conveyor to the second conveyor and wherein the location of discharge is not fixed, wherein an intermediate collector is provided between the first and second conveyors, in which said intermediate collector includes a plurality of chutes which are able to store the products until an appropriate product receiver is available on said second conveyor.

* * * * *